(12) United States Patent
Campbell et al.

(10) Patent No.: US 9,301,444 B2
(45) Date of Patent: Apr. 5, 2016

(54) ROTARY CUTTING DECK HEIGHT OF CUT ADJUSTMENT MECHANISM

(71) Applicant: DEERE & COMPANY, Moline, IL (US)

(72) Inventors: Chad W. Campbell, Raleigh, NC (US); Chad C. Steen, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/268,608

(22) Filed: May 2, 2014

(65) Prior Publication Data

US 2015/0313077 A1 Nov. 5, 2015

(51) Int. Cl.
*A01D 34/00* (2006.01)
*A01D 34/63* (2006.01)
*A01D 34/835* (2006.01)
*A01D 34/74* (2006.01)
*A01D 34/82* (2006.01)

(52) U.S. Cl.
CPC .............. *A01D 34/006* (2013.01); *A01D 34/63* (2013.01); *A01D 34/74* (2013.01); *A01D 34/82* (2013.01); *A01D 34/835* (2013.01)

(58) Field of Classification Search
CPC ................................ A01D 34/54; A01D 34/74
USPC ......... 56/17.2, 17.1, DIG. 22, 249, 294, 15.2, 56/7; 280/43.13, 43.14, 43.15, 43.16, 280/43.17, 43.2, 43.21
See application file for complete search history.

(56) References Cited

U.S. PATENT DOCUMENTS

| | | | | |
|---|---|---|---|---|
| 3,627,157 A * | 12/1971 | Blatchly | ............... | B66F 19/005 254/124 |
| 3,646,738 A * | 3/1972 | Tiura | ..................... | A01D 63/04 56/314 |
| 3,677,574 A * | 7/1972 | Cyr | ........................ | A01D 34/74 280/43.13 |
| 4,135,457 A | 1/1979 | Willis | | |
| 4,441,306 A | 4/1984 | Kuhn | | |
| 4,835,952 A * | 6/1989 | McLane | .................. | A01D 34/74 280/43.13 |
| 4,962,636 A * | 10/1990 | Sampei | .................. | A01D 34/64 56/17.1 |
| 5,065,568 A * | 11/1991 | Braun | .................... | A01D 34/64 56/14.9 |
| 5,628,169 A * | 5/1997 | Stiller | .................... | A01D 34/43 56/249 |
| 5,927,055 A * | 7/1999 | Ferree | .................. | A01D 34/662 56/15.9 |
| 6,047,530 A | 4/2000 | Bednar | | |
| 6,336,311 B1 | 1/2002 | Bednar | | |

(Continued)

FOREIGN PATENT DOCUMENTS

FR 2814323 A1 3/2002
GB 1141011 A 1/1969

OTHER PUBLICATIONS

Toro Groundsmaster 4500-D & 4700-D. Operator's Manual [online]. The Toro Company, [retrieved in May 2014]. Retrieved from the Internet: <URL: www.toro.com/en-us/Golf/Mowers/Rough/Pages/Model.aspx?pid=Groundmaster-4500-D.

(Continued)

*Primary Examiner* — Árpád Fábián-Kovács

(57) ABSTRACT

A rotary cutting deck height of cut adjustment mechanism includes a front pair of height of cut arms and a rear pair of height of cut arms, each height of cut arm pivotably mounted at an angle to a rotary cutting deck. A height of cut rod extends between a front height of cut arm and a rear height of cut arm on each side of the deck. A height of cut adjustment screw is rotatable to extend or retract each height of cut rod. A linkage is provided between the pair of height of cut adjustment screws, so that the angle of the height of cut arms may be adjusted from a single point.

7 Claims, 4 Drawing Sheets

(56) References Cited

U.S. PATENT DOCUMENTS

| | | | | |
|---|---|---|---|---|
| 6,434,919 | B2* | 8/2002 | Schick | A01D 34/64 56/15.9 |
| 6,658,831 | B2* | 12/2003 | Velke | A01D 34/64 56/14.7 |
| 7,013,626 | B1* | 3/2006 | Strope | A01D 34/68 56/15.8 |
| 7,395,648 | B1 | 7/2008 | Silbernagel et al. | |
| 7,716,907 | B2 | 5/2010 | Joliff et al. | |
| 8,261,522 | B2* | 9/2012 | Coffin | A01D 75/30 56/249 |
| 8,371,095 | B2* | 2/2013 | Grewe | A01D 34/67 56/17.1 |

OTHER PUBLICATIONS

Jacobsen AR3. Safety, Operator's Manual [online]. Jacobsen, [retrieved in May 2014], Retrieved from the Internet: <URL: http://www.jacobsen.com/ar3.

Jacobsen AR722T. Safety, Operator's Manual [online]. Jacobsen, retrieved in May 2014]. Retrieved from the Internet: <URL: http://www.ransomesjacobsen.com/ar722t.

Groundmaster Contour Plus Family. Product Brochure [online]. The Toro Company, 2010 [retrieved in May 2014]. Retrieved from the Internet: <URL: https://media.toro.com/CatalogDocuments/Product%20Literature/Contour_Plus_Family_Brochure_Final.pdf.

John Deere 7400 TerrainCut. Product Web Page [online]. Deere & Company, 2014 [retrieved in May 2014]. Retrieved from the Internet: <URL: http://www.deere.ca/wps/dcom/en_CA/products/equipment/rough_trim_surrounds_mowers/7400_trim_mower/7400_trim_mower.page?#viewTabs.

John Deere 8800 TerrainCut . Product Web Page [online]. Deere & Company, 2014 [retrieved in May 2014]. Retrieved from the Internet: <URL: http://www.deere.ca/wps/dcom/en_CA/products/equipment/rough_trim_surrounds_mowers/8800_terraincut_rough_mower/8800_terraincut_rough_mower.page.

Search Report issued in counterpart application No. GB1506926.3, dated Sep. 28, 2015 (4 pages).

* cited by examiner

ROTARY CUTTING DECK HEIGHT OF CUT ADJUSTMENT MECHANISM

FIELD OF THE INVENTION

The present invention relates to grass mowing machines for golf course roughs, and more specifically to a rotary cutting deck height of cut adjustment mechanism.

BACKGROUND OF THE INVENTION

Many new and existing golf courses have narrowed their fairways and expanded their rough areas on either side of the fairways. Roughs require less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or more rotary cutting decks, each rotary cutting deck mounted on the end of a lift arm extending from the traction vehicle. Carrying the rotary cutting decks with lift arms extending from the front or sides of the traction vehicle is necessary and desirable, instead of towing the rotary cutting decks behind the vehicle, because it is necessary for the mower to provide close trims next to trees, bunkers or other hazards. Each lift arm also may be used to move a rotary cutting deck between a mowing position and a transport position. The mounting devices also should allow for pitch (front to back pivoting) and yaw (side-to-side pivoting) of the rotary cutting decks.

Traction vehicles carrying several rotary cutting decks may travel at speeds of 6 to 8 miles per hour when mowing golf course roughs. The traction vehicle's weight may be in excess of 2000 pounds. Each rotary cutting deck may be subject to shocks from impacts against the ground surface or objects during mowing. To withstand the rigorous mowing conditions, rotary cutting decks typically are made of thick sheet steel, such as 7 gage or 10 gage sheet steel. Each rotary cutting deck may have a diameter between about 18 inches and 27 inches, weigh at least 120 pounds, and may have a cutting blade rotated by a hydraulic or electric motor.

Golf course operators sometimes need to change the height of cut of rotary cutting decks on a rough mower. For example, the height of cut may need to be changed if the mower goes from an intermediate rough with a 1½ to 2 inch height of cut, to a full length rough with a 3 to 4 inch height of cut. The height of cut also may need to be changed if the machine is used to mow rough for tournaments where rough heights can be as long as 6 inches. Additionally, golf course operators may change the height of cut of a rotary cutting deck due to seasonal variations, shade conditions, or different types of grass or vegetation in different rough areas of a golf course.

Rotary cutting deck height of cut adjustment mechanisms may include side plates having a vertically-spaced series of holes, and bolts extending through the holes to secure the deck to the side plates. The deck height may be adjusted by changing the holes in the deck plates and/or the holes in the side plates through which the bolts extend. Other rotary cutting deck height of cut adjustment mechanisms include spacers that may be stacked on several pins that support the deck on a frame, or on casters that are mounted in vertically oriented sleeves. Changing height of cut using the holes or spacers at each of four adjustment points can be cumbersome and time consuming.

U.S. Pat. No. 7,716,907 assigned to Deere & Company of Moline, Ill. relates to a rotary cutting deck height of cut adjustment mechanism for that includes a front pair and a rear pair of height of cut arms, and an axle extending between each pair. Each of the four height of cut arms may be pivoted to support the mower deck at different cutting heights, and each has a notch lock that may be moved between a locked position and an unlocked position at each cutting height. A lever may be used to push each notch lock from an unlocked position to a locked position or pull the notch lock from a locked position to an unlocked position. This height of cut mechanism eliminates the holes or spacers, but the notch locks must be cleaned or maintained periodically to remove debris and loosen the joints, release the lever and clean out the grooves. A rotary cutting deck height of cut adjustment mechanism is needed that is faster and more efficient to adjust cutting heights, reduces maintenance and is low in cost.

SUMMARY OF THE INVENTION

A rotary cutting deck height of cut adjustment mechanism includes a front pair of height of cut arms and a rear pair of height of cut arms supporting a rotary cutting deck, and at least one height of cut adjustment screw that may be rotated to simultaneously change the angle of the height of cut arms.

DESCRIPTION OF THE PREFERRED EMBODIMENT

Figure 1:
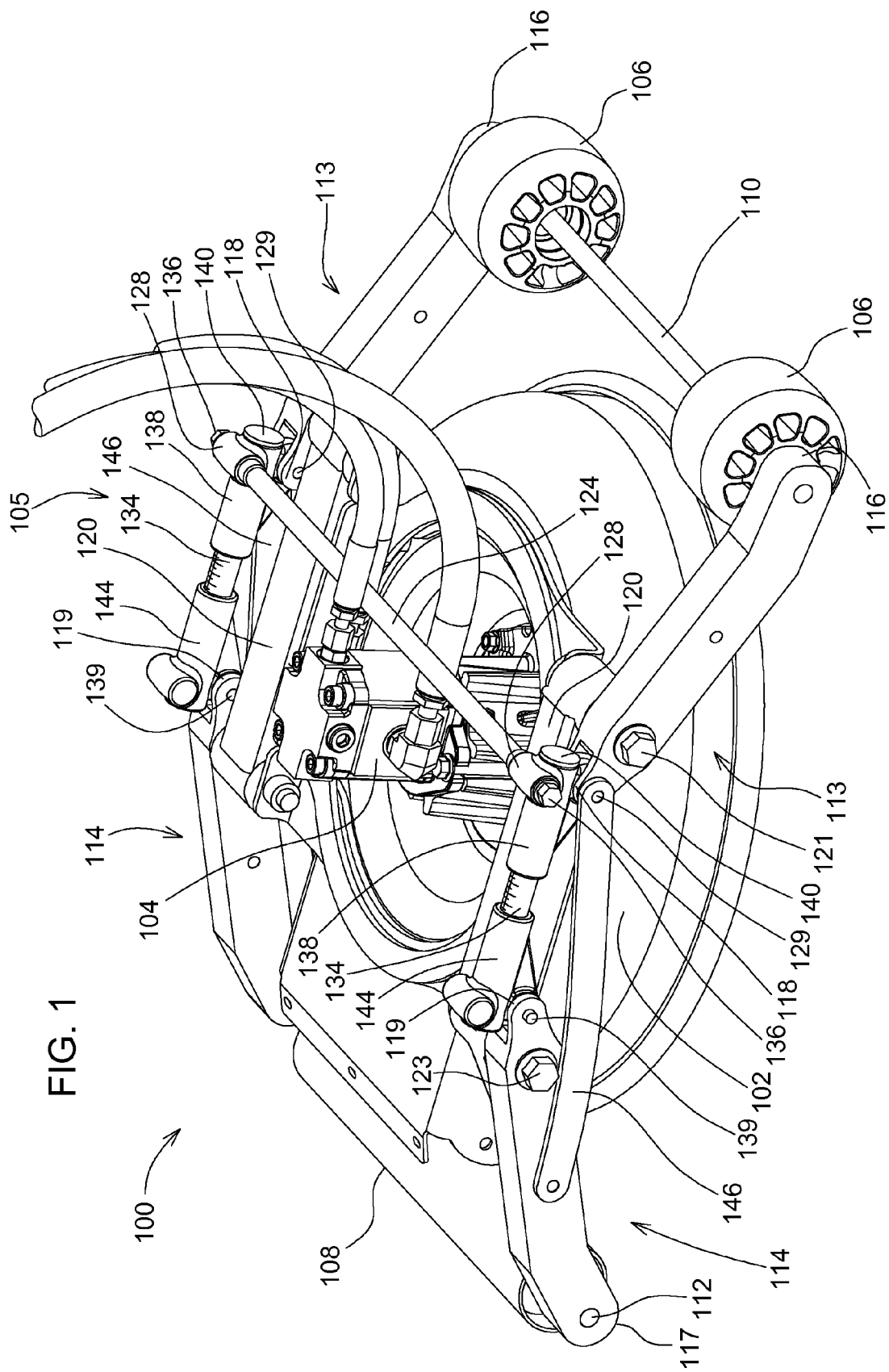
FIG. 1 is a perspective view of a rotary cutting deck height of cut adjustment mechanism at a first cutting height according to a first embodiment of the invention.
Figure 2:
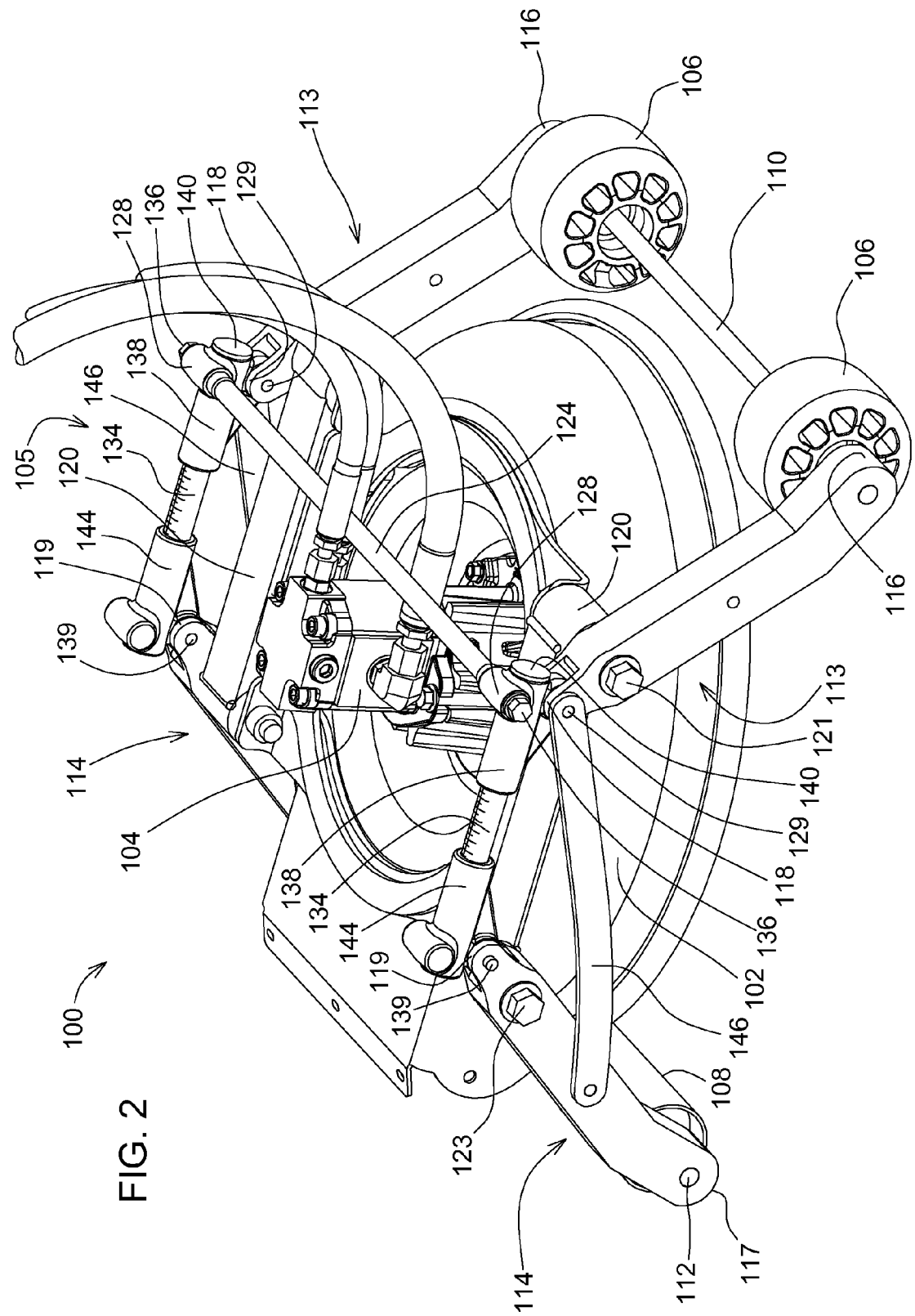
FIG. 2 is a perspective view of a rotary cutting deck height of cut adjustment mechanism at a second cutting height according to a first embodiment of the invention.

As shown in FIGS. 1 and 2, in a first embodiment, rotary cutting deck 100 includes a circular inverted dish-shaped cutting chamber 102. A motor such as hydrostatic motor 104 may be mounted to the rotary cutting deck. The motor turns a cutting blade attached to a generally vertically aligned spindle under the deck. The rotary cutting deck may be supported over the ground surface by ground engaging members at the front and rear of the deck, such as front pair of rollers 106 and rear roller 108.

Figure 4:
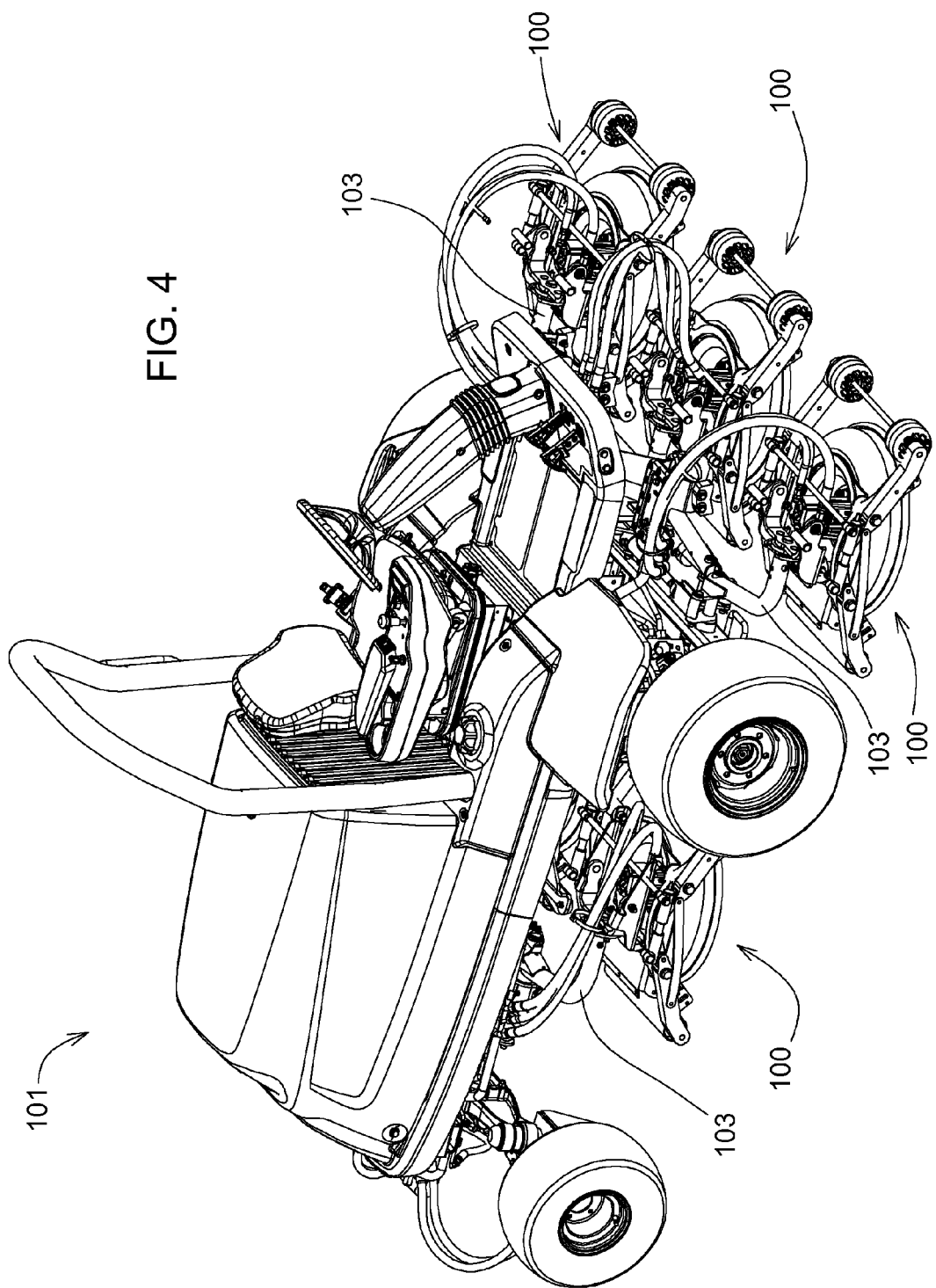
FIG. 4 is a perspective view of a traction vehicle having several rotary cutting decks mounted on lift arms extending from the vehicle, each with a rotary cutting deck height of cut adjustment mechanism according to a preferred embodiment of the invention.

In one embodiment, as shown in FIG. 4, three or more rotary cutting decks may be mounted to traction vehicle 101. Each rotary cutting deck 100 may be pivotably supported at the end of a lift arm 103 which the operator may actuate with one or more hydraulic cylinders or electric lift mechanisms to raise or lower the rotary cutting decks between mowing positions and transport positions.

In one embodiment, one or more rollers, casters or wheels 106 may be rotatably mounted to and supported by axle 110 at or near the front of the rotary cutting deck. Alternatively, other ground engaging members such as a roller, caster or wheel may be independently mounted to each front height of cut arm 113. One or more rear rollers 108 may be rotatably mounted to and supported by internal shaft or axle 112 at or adjacent the rear of the rotary cutting deck. Alternatively, the rear of the rotary cutting deck may be supported by an axle with one or more casters or wheels. Or other ground engaging members such as a roller, caster or wheel may be independently mounted to each rear height of cut arm 114.

In one embodiment, height of cut adjustment mechanism 105 may include a front pair of height of cut arms 113 and a rear pair of height of cut arms 114. The height of cut adjustment mechanism may be used to change the angle of the height of cut arms from a single adjustment point by pivoting the front and rear pairs of height of cut arms simultaneously. Front axle 110 or a roller, caster or wheel may be mounted to each front height of cut arm 113 adjacent a first or lower end 116 of the arm. Each front height of cut arm 113 may have a pivot axis 121 located near the second or upper end 118 of the front height of cut arm, pivotably mounting the front height of cut arm to mounting bracket 120 on the rotary cutting deck. Rear axle 112 or a roller, caster or wheel may be mounted to each rear height of cut arm 114 adjacent a first or lower end 117 of the arm. Each rear height of cut arm 114 may have a pivot axis 123 located near the second or upper end 119 of the rear height of cut arm, pivotably mounting the rear height of cut arm to mounting bracket 120.

In one embodiment, height of cut adjustment mechanism 105 may include at least one, and preferably a pair of height of cut adjustment screws 136. An operator may rotate height of cut adjustment screw 136 with a wrench or power drill and socket to simultaneously pivot the front and rear height of cut arms to change the height of cut. The height of cut adjustment screw may be rotated to extend or retract height of cut rod 134.

In one embodiment, height of cut adjustment mechanism 105 includes a pair of height of cut rods 134 that extend fore and aft between pivot points at the upper ends of a front height of cut arm and a rear height of cut arm. For example, each height of cut rod 134 may extend between front support 138 and rear support 144. Front support 138 may be a sleeve shaped casting pivotably mounted at pivot point 129 near the second or upper end 118 of front height of cut arm 113. Rear support 144 also may be a sleeve shaped casting pivotably mounted at pivot point 139 near the second or upper end 119 of rear height of cut arm 114. For example, each height of cut rod 134 may be extended or retracted from the supports to simultaneously change the angles of the front and rear height of cut arms. However, one end of the height of cut rod may be fixed with respect to one of the pivot points and/or supports, or may be integral with one of the supports.

In one embodiment, height of cut adjustment screw 136 may be rotated to increase or decrease the length of height of cut rod 134 between the front height of cut arm and rear height of cut arm. For example, turning height of cut adjustment screw 136 extends or retracts the height of cut rod and changes the angular position of the front and rear height of cut arms. Height of cut rod 134 also may include index markings to provide a visible height of cut indicator for each angular position.

Figure 3:
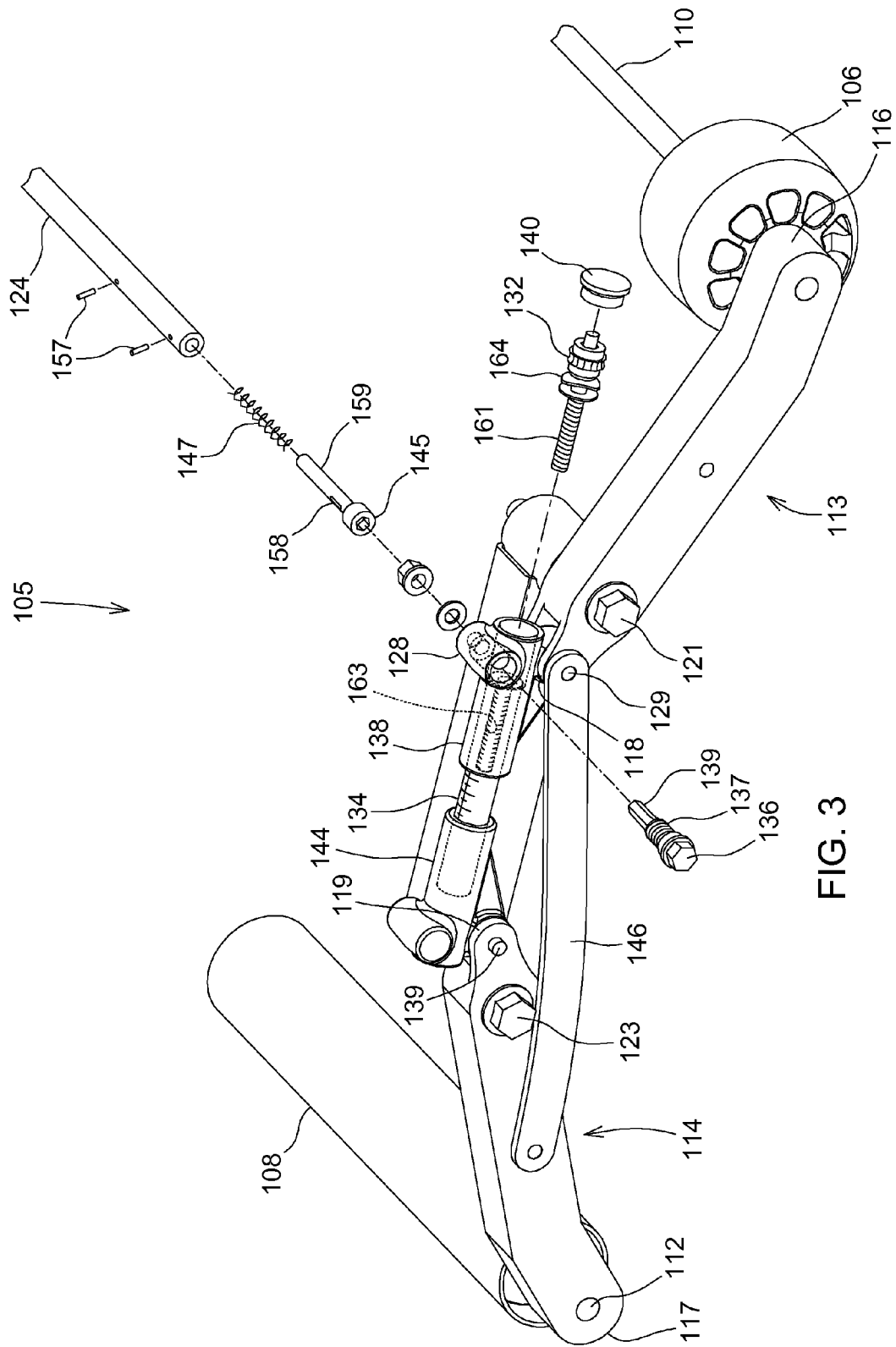
FIG. 3 is a partially exploded perspective view of a rotary cutting deck height of cut adjustment mechanism according to a first embodiment of the present invention.

In one embodiment, as shown in FIG. 3, height of cut adjustment screw 136 may include worm 137 that engages worm gear 132. Each worm gear 132 may be inserted into front support 138, and may be covered by cap 140. Worm gear 132 may be attached to threaded shaft 161 that engages internally threaded portion 163 of height of cut rod 134. Bellville spring 164 may help the worm gear 132 and threaded shaft 161 to maintain its position in support 138.

In one embodiment, height of cut adjustment mechanism 105 may include a linkage between a pair of height of cut adjustment screws 136, with one adjustment screw on the left side of the rotary cutting deck and the other on the right side of the rotary cutting deck. For example, the linkage may be cross tube 124. Cross tube 124 may be releasably connected to the height of cut adjustment screws on each side of the deck. Each height of cut adjustment screw 136 may be inserted through case 128 which may be part of the same casting as front support 138.

In one embodiment, each adjustment screw 136 may have a hex head or other engageable end extending out from case 128 that may be engaged and rotated with a tool (i.e., a wrench or power drill socket) to change the height of cut. A second end of adjustment screw 136 may engage the linkage such as cross tube 124. For example, the second end of the adjustment screw may have a hex head 139 that engages socket 145. Socket 145 may have a shaft that is inserted into cross tube 124 so the socket and cross tube can rotate in unison. For example, shaft 159 may be mechanically coupled to cross tube 124 with pins 157 or other fasteners engaging slots 158. Additionally, compression spring 147 may be inserted into one end of the cross tube. The compression spring may help removal of the cross tube by sliding the cross tube over sleeve 159 until compression spring 147 is compressed sufficiently so the socket on the opposite end of the cross tube releases the hex head 139 of adjustment screw 136.

In one embodiment, height of cut adjustment mechanism 105 may include stabilizer bar 146 that provides a linkage between the front height of cut arm 113 and rear height of cut arm 114 on each side of the deck. Each stabilizer bar 146 may be pivotably connected to rear height of cut arm 114 between axle 112 and pivot axis 119. Each stabilizer bar 146 may be pivotably connected to front height of cut arm 113 at pivot point 129 adjacent the second or upper end 118. The stabilizer bar on each side of the deck assures that the front height of cut arm is at the same angle and height as the rear height of cut arm. The position of the stabilizer bar on the front and rear height of cut arms also may help maintain a desired rake angle. For example, the deck may have a slight forward rake during mowing, preferably with the front of the deck about ⅛ inch lower than the back.

The invention provides an improved mechanism for adjusting the height of cut of a rotary cutting deck mounted to a lift arm of a traction vehicle. The rotary cutting deck height of cut adjustment mechanism is relatively low in cost and reduces the time and effort for maintenance and changing the cutting height.

Having described the preferred embodiment, it will become apparent that various modifications can be made without departing from the scope of the invention as defined in the accompanying claims.

The invention claimed is:

1. A rotary cutting deck height of cut adjustment mechanism, comprising:
 a front height of cut arm and a rear height of cut arm, each height of cut arm pivotably mounted to a rotary cutting deck at a pivot point at an upper end of each height of cut arm;
 a height of cut rod extending between the front height of cut arm and the rear height of cut arm;
 a rotatable height of cut adjustment screw that extends or retracts the height of cut rod to change an angle of each height of cut arm relative to the rotary cutting deck; and a stabilizer bar linking the front height of cut arm at the pivot point with the rear height of cut arm below the pivot point.

2. The rotary cutting deck height of cut adjustment mechanism of claim 1 wherein the height of cut adjustment screw includes a worm that engages a worm gear.

3. The rotary cutting deck height of cut adjustment mechanism of claim 1 further comprising a support pivotably mounted to an upper end of each of the height of cut arms; one of the height of cut rods extending at least partially through each support.

4. A rotary cutting deck height of cut adjustment mechanism, comprising:
- a pair of front height of cut arms extending at an angle from a rotary cutting deck and supporting the rotary cutting deck on at least one rotatable ground engaging member;
- a pair of rear height of cut arms extending at an angle from the rotary cutting deck and supporting the rotary cutting deck on at least one rotatable ground engaging member;
- a support mounted to an upper end of each height of cut arm;
- a height of cut rod between the support on each front height of cut arm and each rear height of cut arm;
- a height of cut adjustment screw that extends and retracts the rod from at least one of the supports to change the angle of the height of cut arms; and
- a stabilizer bar connecting each front height of cut arm at the upper end to each rear height of cut arm below the upper end.

5. The rotary cutting deck height of cut adjustment mechanism of claim 4 wherein the adjustment screw includes a worm that engages a worm gear.

6. The rotary cutting deck height of cut adjustment mechanism of claim 4 further comprising a pair of height of cut adjustment screws and a linkage connected between each adjustment screw.

7. The rotary cutting deck height of cut adjustment mechanism of claim 4 further comprising a threaded rod engaging an internally threaded portion of the height of cut rod.

* * * * *